Patented Mar. 15, 1932

1,849,920

UNITED STATES PATENT OFFICE

WILLIS A. GIBBONS, OF MONTCLAIR, NEW JERSEY, AND EARDLEY HAZELL, OF NEW YORK, N. Y., ASSIGNORS TO REVERE RUBBER COMPANY, OF PROVIDENCE, RHODE ISLAND, A CORPORATION OF RHODE ISLAND

PROCESS OF MANUFACTURING HARD RUBBER DUST AND PRODUCT

No Drawing.  Application filed November 19, 1929.  Serial No. 408,410.

This invention relates to a process for making a hard rubber dust and product.

For many purposes in the arts, hard rubber has an established standing, and none of the various plastics developed in recent years has been able to replace hard rubber for all of these. Hard rubber, as is well known, is formed by compounding rubber with a much larger percentage of sulphur than is used in the manufacture of soft rubber goods, and heating the compound for a much longer time and at a higher temperature than in the case of vulcanized soft rubber. In compounding hard rubber stocks one of the ingredients used for many years has been hard rubber dust. Probably the first use of this material was merely to furnish an outlet for scrap hard rubber. However, it has been known for a long time that the addition of hard rubber dust to a hard rubber compound imparts a number of desirable properties, such as reducing shrinkage in the mold, imparting gloss to the molded article, and giving a faster rate of cure. As a result of the demand for hard rubber dust, it has been necessary to supplement the supply of scrap hard rubber by curing mixtures of crude or reclaimed rubber with sulphur to hard rubber and then grinding the product.

There are certain disadvantages in the use of scrap hard rubber, such as variation in the quality due to variation in cure, amount of free and combined sulphur and amount of compounding or filling materials. Another disadvantage is that hard rubber scrap frequently contains foreign matter, such as small metal inserts which are ground up and will only show up in the polished, finished article. There are also certain disadvantages in making the hard rubber dust from a freshly cured rubber compound, among which are the presence of free sulphur which is difficult to remove, and the inability to use accelerators by reason of the fact that the compounds tend to prevulcanize on the mill rolls. Finally, in the case of both the scrap and the freshly prepared hard rubber, there is an objection due to the expense of grinding the tough hard product, and the fire and explosion risk due to the inflammability of the material.

An object of our invention is to provide a process for making hard rubber dust which will produce a uniform product, which will obviate fire risk, which will permit the addition of any desired compounding ingredients, and which will allow the ready removal of any uncombined sulphur. A further object is to provide a process which will produce a hard rubber dust of very fine and uniform particle size. Other objects will appear from the detailed description and claims.

The invention consists broadly in compounding a rubber dispersion in a manner to give a hard rubber, curing the compound to hard rubber while in dispersed form and recovering a hard rubber dust from the cured dispersion. The invention also resides in the product of the process.

As one example of the process, rubber latex of suitable concentration in quantity, sufficient to provide 100 parts of rubber solids, with or without previous treatment such as creaming, stabilizing, or addition of compounding ingredients, is mixed with from 30 to 100 parts of sulphur in a suitably prepared form. Preferably the finely divided sulphur is mixed into an aqueous paste along with a small amount of a material such as soap, glue, the alkali salts of casein, sulphonated castor oil, or the trade product known as Nekal which is a condensation product of an aromatic hydrocarbon and an aliphatic alcohol in the presence of sulphuric acid. The mixture of the sulphur and the rubber latex is then placed in an autoclave and heated for from 8 to 10 hours at approximately 40 lbs. steam pressure. Free sulphur may then be removed from the resulting cured latex and the latter may be spray dried by any of the usual forms of apparatus for spray drying latex, such as those disclosed in patent to Coffin, No. 1,534,030, and patent to Bradley and Coffin, No. 1,428,526. Any excess sulphur can be readily removed from the cured latex before spray drying by sedimentation, screening, centrifuging, etc. It is therefore possible to initially mix enough sulphur with the latex to insure complete combination of sulphur with the rubber. The average particle size of the hard rubber dust obtained by the above process is very fine, the particles are much more uniformly cured than by the prior process, and they are of globular instead of irregular shape.

Instead of using a natural latex, an artificial dispersion of raw or reclaimed rubber may be compounded with from 30 to 100 parts of sulphur in a suitable form and autoclaved for from 8 to 10 hours at 40 lbs. steam pressure, and the solids may be recovered from the resulting cured dispersion by spraying in a heated atmosphere as described in the first example. In this case also the particles of the finished product are very fine, uniform in size and shape, and uniformly cured.

It is obvious that if desired, various dispersions, such as mixtures of crude and reclaimed rubbers or mixtures of crude and reclaimed rubbers and latex may be used for preparing the hard rubber dust. In place of sulphur other curing agents, such as polysulphides may be used, and desired pigments, fillers, softeners, accelerators of vulcanization, etc. may be incorporated in the dispersions before curing. It is obvious that the time and temperature of the cure will depend upon the composition and the quantity of vulcanizing ingredients employed. In place of recovering the hard rubber dust from the dispersion by spray drying, it may be recovered by filtration, that is, withdrawal of fluids through a porous form the pores of which are small enough to prevent passage of the cured hard rubber particles. The resulting deposit on the filter is a crumbly cake which can be readily disintegrated. The hard rubber dust may also be recovered by coagulation with the coagulants commonly employed with latex. The deposit from any coagulating or filtering operation can be washed with solvents to remove any constituents such as soaps, proteins, etc., in case where their presence is not desired.

It will be seen that by our invention a finely divided hard rubber dust of comparatively uniform particle size may be obtained, and that the resulting product is also uniform in composition and this composition may be varied to suit the circumstances, and the dust is obtained without the usual fire risk and inconveniences of the usual grinding process.

Having thus described our invention, what we claim and desire to protect by Letters Patent is:

1. Process for making a hard rubber dust which comprises combining a vulcanizing agent with rubber to substantially the saturation point of the rubber while the latter is in dispersed form, and recovering a hard rubber dust from the dispersion.

2. Process for making a hard rubber dust which comprises combining sulphur with a water dispersion of rubber until a dispersion of hard rubber is formed, and recovering hard rubber dust from the dispersion.

3. Process for making a hard rubber dust which comprises mixing approximately 30 to 100 parts of sulphur with a water dispersion of rubber containing 100 parts rubber solids, vulcanizing to a hard rubber dispersion by heat and pressure, and freeing the dispersed particles from moisture.

4. Process for making a hard rubber dust which comprises vulcanizing rubber latex containing 100 parts rubber solids under heat and pressure in the presence of more than thirty parts of sulphur, and recovering comminuted hard rubber from the vulcanized latex.

5. Process for making a hard rubber dust which comprises vulcanizing a rubber dispersion under heat and pressure in the presence of a sufficient amount of a vulcanizing agent to form hard rubber, and spray drying the vulcanized dispersion.

6. Process for making a hard rubber dust which comprises vulcanizing rubber latex containing 100 parts rubber solids to dispersed hard rubber in the presence of 30 to 100 parts of sulphur, and spray drying the vulcanized product.

7. Process for making a hard rubber dust which comprises vulcanizing a water dispersion of rubber containing 100 parts rubber solids in the presence of 30 to 100 parts of sulphur for 8 to 10 hours at approximately 40 lbs. steam pressure, and spray drying the dispersion.

8. As a new product, a hard rubber dust composed of individually vulcanized fine particles of hard rubber.

9. As a new article, the dried product of a water dispersion of hard rubber.

10. As a new article, hard rubber dust composed of relatively uniformly fine globular particles of hard rubber.

Signed at Passaic, county of Passaic, and State of New Jersey, this 15th day of November, 1929.

WILLIS A. GIBBONS.

Signed at Passaic, county of Passaic, and State of New Jersey, this 15th day of November, 1929.

EARDLEY HAZELL.